US005937628A

United States Patent [19]

Matechuk

[11] Patent Number: 5,937,628

[45] Date of Patent: Aug. 17, 1999

[54] MANUALLY OPERABLE SPREADING APPARATUS FOR FLOWABLE MATERIALS

[76] Inventor: William Matechuk, 6270 Doreen Dr., Niagara Falls, Ontario, Canada, L2E 5K2

[21] Appl. No.: 08/933,879

[22] Filed: Sep. 19, 1997

[51] Int. Cl.[6] ........................................ A01D 07/06

[52] U.S. Cl. ........................ 56/400.05; 239/754; 239/378

[58] Field of Search ............................ 56/400.05, 400.06, 56/400.07, 400.04, 16.8; 239/754, 280, 289, 320, 328, 376, 378, 379, 455, 532, 578

[56] References Cited

U.S. PATENT DOCUMENTS

| | | | |
|---|---|---|---|
| 4,628,674 | 12/1986 | Dougan | 56/400.17 X |
| 5,593,091 | 1/1997 | Harris | 239/754 X |
| 5,769,324 | 6/1998 | Lenhart | 239/532 X |

*Primary Examiner*—Terry Lee Melius

[57] ABSTRACT

A manually operable spreading apparatus for uniformly spreading flowable material, such as a sealant or adhesive, on a surface comprises a handle with a transversely extending spreader blade at one end and a reservoir chamber for the flowable material mounted on the handle. Valve means at the resevoir lower end are operable to discharge material from the reservoir for engagement by the spreader blade. Preferably the reservoir chamber is provided with a lining of flexible plastics material that also comprises a container for the flowable material. The lining preferably is of length greater than the reservoir chamber so that its lower end extends into the close neighbourhood of the spreader blade. The lining may be provided by a sealed bag of the material, the lower end of which is opened after installation, or by an open-ended tube, the lower ends of the bag or tube being closable by the valve means. The reservoir body preferably is of circular cross section and the valve body preferably is circular in end elevation and Z shape in side elevation, the bottom bar of the Z comprises a blade valve closure member; a spring is interposed between the cross bar of the Z and the handle to close the valve. The spreader blade preferably is provided with a pair of spring urged side retainer blades pivoted at respective ends to form therewith a rectangular structure confining the material to the area of the surface over which the spreader blade moves.

30 Claims, 3 Drawing Sheets

FIG. 3
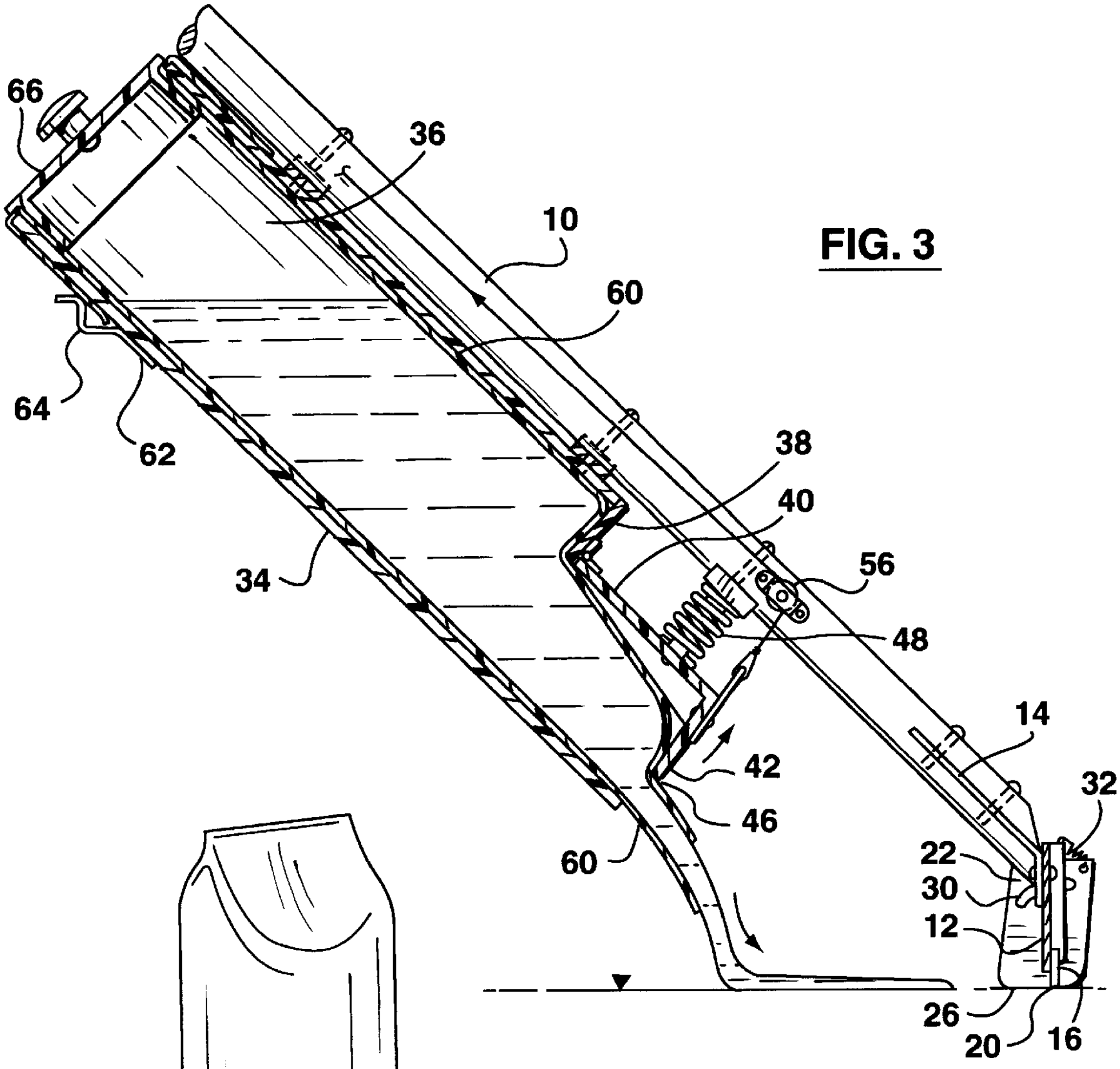
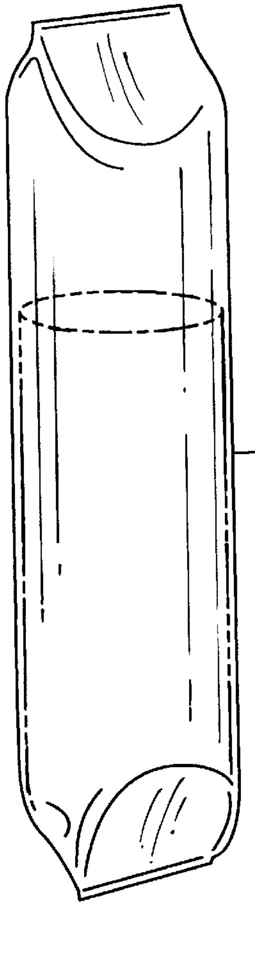
FIG. 4

MANUALLY OPERABLE SPREADING APPARATUS FOR FLOWABLE MATERIALS

FIELD OF THE INVENTION

This invention is concerned with improvements in or relating to manually operable spreading apparatus for flowable materials, more specifically with improvements in or relating to apparatus for spreading a flowable adhesive and/or sealing material on a surface, such as a floor, to which flooring material, such as carpet, vinyl tile, and rugs are to be fastened.

BACKGROUND OF THE INVENTION

A number of service industries in which a decorative or protective finish is applied to a surface employ an adhesive and/or sealing material for that purpose and require that a thin coating of the material be spread uniformly on the receiving surface. A particular industry with such a requirement is the installation of coverings on floors and/or walls, such as carpet, sheet plastics material, plastic or ceramic tiles, and layers of thin hardwood strips. The sealants and adhesives are supplied in a variety of containers of the type also generally used for paints. Thus, small quantities of a litre or part litre are supplied in metal cans with press-on lids, while larger quantities, e.g. 20 or 40 litres, are supplied in small plastic drums with snap-on lids. Irrespective of the size of the surface that is to be coated, the usual method of application is for a quantity of the material to be poured onto the surface, if it is sufficiently easily flowable, or if too viscous to be poured easily, for small quantities to be scooped from the container and dumped on the surface. It is then spread uniformly by the operator, kneeling when the surface is a floor, employing for the purpose a metal or plastics hand tool of approximately rectangular shape, usually about 20 cm (8 ins) in width, the longer straight edge which engages the floor being toothed or serrated in a regular pattern so as to provide a row of uniform-size, uniformly-spaced gaps whereby corresponding uniform-size, uniformly parallel spaced lines of the adhesive are formed on the surface as the tool is dragged over it, the surplus material being pressed ahead of the tool and escaping around the edges. Such operations are labour-intensive and also tend to be somewhat messy unless the operator is particularly careful, especially as the container is emptied, when it becomes more difficult to extract the remaining material therefrom. There is therefore a need for apparatus which facilitates delivery of the material to the surface and also facilitates its subsequent spreading over the surface.

SUMMARY OF THE INVENTION

It is therefore the principal object of the invention to provide new manually operable spreading apparatus for flowable materials providing for the ready supply of the flowable material onto the surface on which it is to be spread under the control of the operator.

It is another object to provide in such apparatus a container for the flowable material that facilitates its supply to the surface under the control of the operator and renewal of the supply of the material to the apparatus.

It is a further object to provide such spreading apparatus having a spreader blade that facilitates control of the spread of the flowable material over the receiving surface.

In accordance with the present invention there is provided manually operable spreading apparatus for the uniform spreading on a surface of a flowable material comprising:

a handle for grasping by an operator of the apparatus;

a spreader blade at one end of the handle extending transversely therefrom and having a transversely extending surface engaging edge;

a reservoir chamber for flowable material on the handle intermediate its ends, the resevoir chamber having an upper end and a lower end; and valve means at the lower end of the reservoir chamber operable by the operator to permit discharge of flowable material from the reservoir on to the surface for engagement and spreading thereon by the spreader blade.

Also in accordance with the invention there is provided spreading apparatus for the uniform spreading on a surface of a flowable material comprising:

a handle for grasping by an operator of the apparatus;

a spreader blade at one end of the handle extending transversely therefrom at a right angle thereto and having a transversely extending surface engaging edge;

a pair of side retainer blades pivotally mounted at respective ends of the spreader blade, each having a surface engaging edge extending at a respective right angle to the spreader blade surface engaging edge, the side retainer blades forming with the spreader blade a rectangular retaining structure into which flowable material to be spread is discharged and which confines the flowable material to the area of the surface over which the spreader blade is moved by the operator; and spring means operative between each side retainer blade and the spreader blade and urging the respective side retainer blade to rotate in the direction required to maintain contact of its entire surface engaging edge with the surface as the inclination of the handle to the surface is changed.

DESCRIPTION OF THE DRAWINGS

Manually operable spreading apparatus that are particular preferred embodiments of the invention will now be described, by way of example, with reference to the accompanying diagrammatic drawings, wherein:

FIG. 3 is a longitudinal cross-section through the apparatus of FIG. 1 taken on a vertical plane containing the line 3—3 in that Figure;

FIG. 4 is a perspective view of a preferred form of container for the flowable material, intended for use with the apparatus of FIGS. 1 and 3, and comprising a sealed bag of transparent flexible plastics material;

DESCRIPTION OF THE PREFERRED EMBODIMENTS

Figures 1, 2:
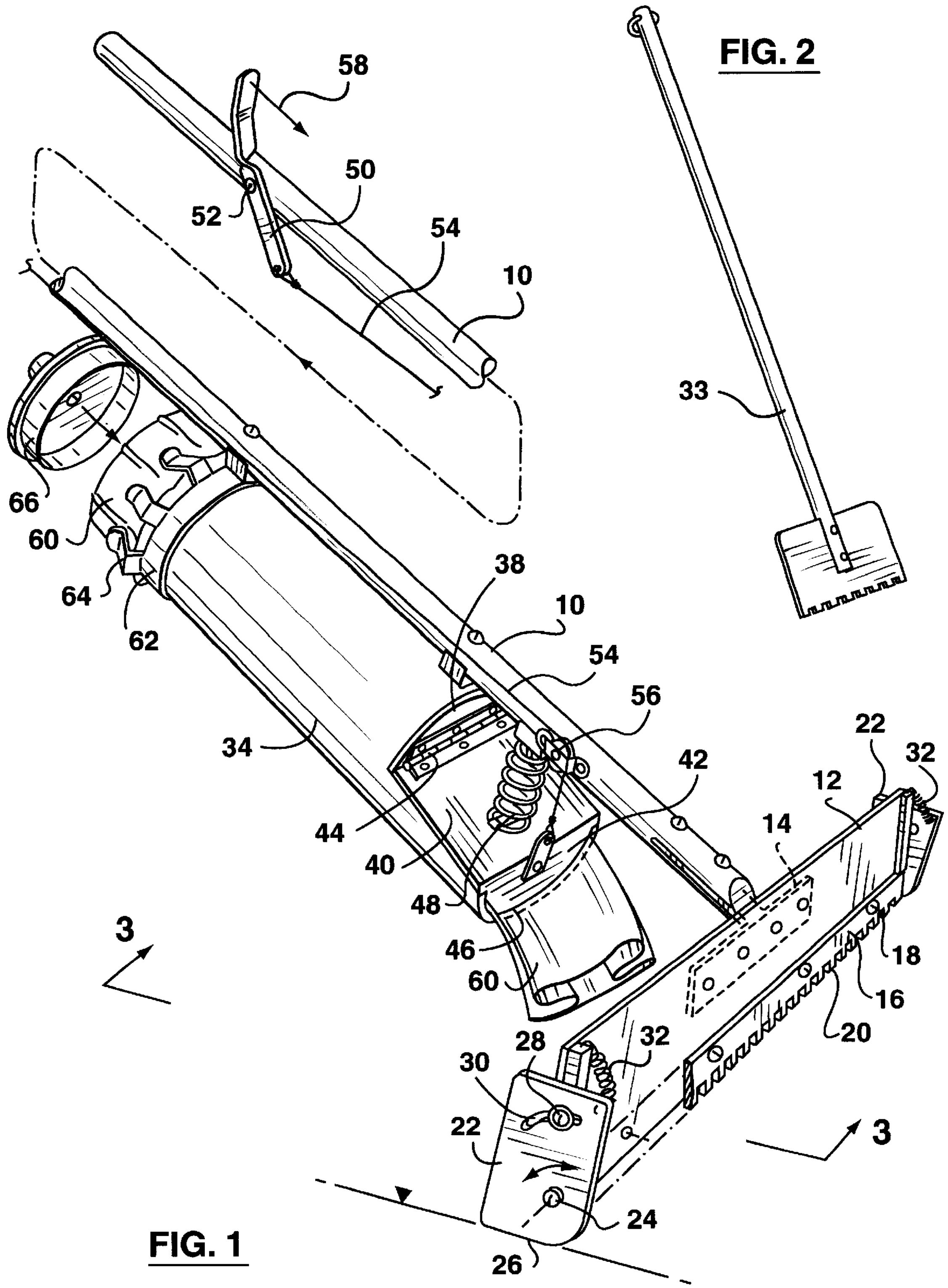
FIG. 1 is a perspective view from one side of a spreading apparatus that is a first embodiment of the invention.
FIG. 2 is a similar perspective view of a smaller hand spreader tool that may be used in conjunction with the spreading apparatus of FIG. 1.

The spreading apparatus of FIGS. 1 and 3 comprises an elongated handle 10 of cylindrical cross section and of length, e.g. 137 cms (54 ins), such that the device is easily operable by the operator while standing. The handle carries at its lower end a rectangular transversely extending spreader main blade member 12, which in this embodiment is 46 cm (18 ins) in width, the main blade member being fastened to the handle via an attachment bracket 14. A rectangular subsidiary blade member 16, of the same width as the main blade member but of much smaller height, is detachably attached to the main blade member via screws 18 and provides a long, straight spreader blade edge 20 that engages the surface over which flowable material is to be spread by the device. For most applications this edge is toothed or serrated in a regular pattern so as to provide a row of uniform-size, uniformly-spaced gaps whereby corresponding uniform-size, uniformly spaced lines of the material are left on the surface as the apparatus is moved over it. The apparatus will usually comprise a set of subsidiary blade members of different tooth sizes and spacings to adapt it for different materials to be spread. The replaceable subsidiary blade member also enables only this smaller part to be replaced simply and easily if the edge 20 becomes worn to an unacceptable extent.

A problem with the narrower hand held tools used hitherto is that the surplus material ahead of the tool escapes around the edges as it is moved over the surface, making it more difficult and time consuming to ensure that the coating obtained is uniform, since the tool must be moved repeatedly over the escaped material to level it. This problem is avoided with the apparatus of the invention by the provision of a pair of side retainer blades 22 pivotally mounted by respective pivots 24 at opposite ends of the main spreader blade member 12. Each side retainer blade has a respective surface engaging edge 26 extending at a right angle to the spreader blade surface engaging edge 20, the side retainer blades thus forming with the spreader blade a retaining structure of rectangular shape which, when the flowable material is discharged therein, will confine the material to the area of the surface over which the spreader blade is moved, so that the need for repeated passes is at least substantially reduced. The pivotal mounting of the side retainer blades enables them to rotate so that the edges 26 can remain in adequate contact with the material receiving surface over their entire length, despite changes in the inclination of the handle to the surface as the apparatus is moved back and forth, and also despite use by operators of different heights. The extent of the pivotal movement is determined by a stop pin 28 which moves in a respective arcuate guide slot 30 struck about the axis of the pivot 24, while contact of each surface engaging edge 26 with the surface is maintained by respective tension spring means 32 connected between each side retainer blade and the spreader blade main member 12 and urging the side retainer blades to rotate in the required direction. Owing to the width of the spreader blade that preferably is employed with the apparatus of the invention situations can arise where it cannot spread over small areas, particularly inside corners, and in such an eventuality the operator is able to make use of a simple hand spreader 33, as shown in FIG. 2, employing a spreader blade of much smaller width.

With the apparatus of the invention a substantial quantity of the material to be spread is carried with the device by means of a reservoir comprising a reservoir body 34 mounted on the handle intermediate its ends, as close as possible to the lower end, while at a location to provide a suitable balance to the apparatus for ease of handling. In this embodiment the body 34 is a cylindrical tube providing a reservoir chamber 36 of circular transverse cross section. Valve means are provided at the lower end of the reservoir chamber and are operable by the operator to control discharge of flowable material from the reservoir on to the surface into the rectangular area bounded by the spreader blade 12,20 and the side retainer blades 22, the valve means including a valve blade member (described below) movable between a closed position shown in FIG. 1 and an open position shown in FIG. 3. The valve means comprises a valve body of the shape in end elevation of the cross section of the reservoir chamber, in this embodiment of circular shape, and with the valve blade member in the closed position the valve body closes the reservoir lower end against discharge of flowable material from the reservoir chamber 36. The valve body is of Z shape in side elevation and the bottom end of the reservoir body is cut away to provide a corresponding shape into which the valve body fits. Thus, the part 38 of the valve body constituting the top bar of the Z has the shape of a segment of a circle and is rigid with the reservoir chamber body, while the parts 40 and 42, comprising respectively the cross bar and bottom bar of the Z, are rigid with one another and movable with respect to the reservoir body. The cross bar 40 is pivotally connected by a hinge 44 to the top bar 38 to permit movement of the cross and bottom bars from the valve closed to the valve open position, while the bottom bar 42 also has the shape of a segment of a circle to complete with the top and cross bars the circular end elevation shape. The bottom bar 42 constitutes a valve blade and has a rounded, part-circular, circumferential edge 46 that in valve closed position engages the inner circumferential wall of the reservoir chamber and in valve open position is spaced from the wall to provide a crescent-shaped gap through which the material discharges.

The valve means also comprises a valve closing compression spring 48 interposed between the cross bar 40 and the apparatus handle 10 and urging the valve member to the valve closed position, while means for opening the valve when required comprise a hand lever 50 pivoted at 52 to the handle 10 adjacent its upper end and a movable connection comprising a flexible cable 54 connected at its ends to the lever 50 and the bottom bar 42 and passing over a pulley 56 attached to the handle. Movement of the lever in the direction of the arrow 58 in FIG. 1 against the urge of the spring 48 causes movement of the valve blade member to the open position, while its release results in pivoting movement in the other direction and movement of the valve blade member to the closed position.

The flowable adhesive and sealing materials with which the apparatus is employed inherently are adherent, even to plastics materials surfaces if employed for the reservoir body 34, and it would be difficult and time consuming to thoroughly clean the reservoir interior and the valve after each use or at the end of a work period. This is avoided with the apparatus of the invention by providing the reservoir chamber with a lining 60 of flexible plastics material which also comprises a container for the flowable material. The lining is of length greater than that of the reservoir chamber so that when installed therein, as shown in FIGS. 1 and 3, a substantial length of its lower end extends from the lower end of the reservoir chamber and discharges the flowable material even closer than the valve can to the spreader blade. Because of the flexibility of the material the valve blade is operable with the container formed by the lining to close its lower end and control the discharge of the flowable material therefrom. The interior surface of the resevoir chamber and the valve blade edge 46 contact only the exterior surface of the lining, so that with care only the lining is contacted by the flowable material and the lining is sufficiently inexpensive to be discarded after each use.

As is illustrated by FIGS. 1 and 3 the reservoir chamber lining 60 may comprise an open-ended tube that is inserted into the reservoir chamber with the valve open until its lower end protrudes sufficiently out of the lower end of the chamber, when the valve is closed to close the lower tube end. The upper end of the reservoir chamber is provided with spring retaining means comprising a ring 62 encircling the reservoir body, the ring being provided with a plurality of circumferentially spaced upward extending spring fingers 64 engageable with the upper end of the open-ended tube that has been folded down around the upper end of the reservoir body, the fingers retaining the upper end against movement while the tube is filled with flowable material through its open upper end, and also while the flowable material is discharged therefrom. In operation the upper end is closed by a circular cap that is a snug press fit into the upper end. At the end of a spreading operation, if a sufficient quantity of the flowable material remains in the tubular container its open ends can be closed using wire ties, so that the container can be removed and the material stored until it can be used.

Figure 5:
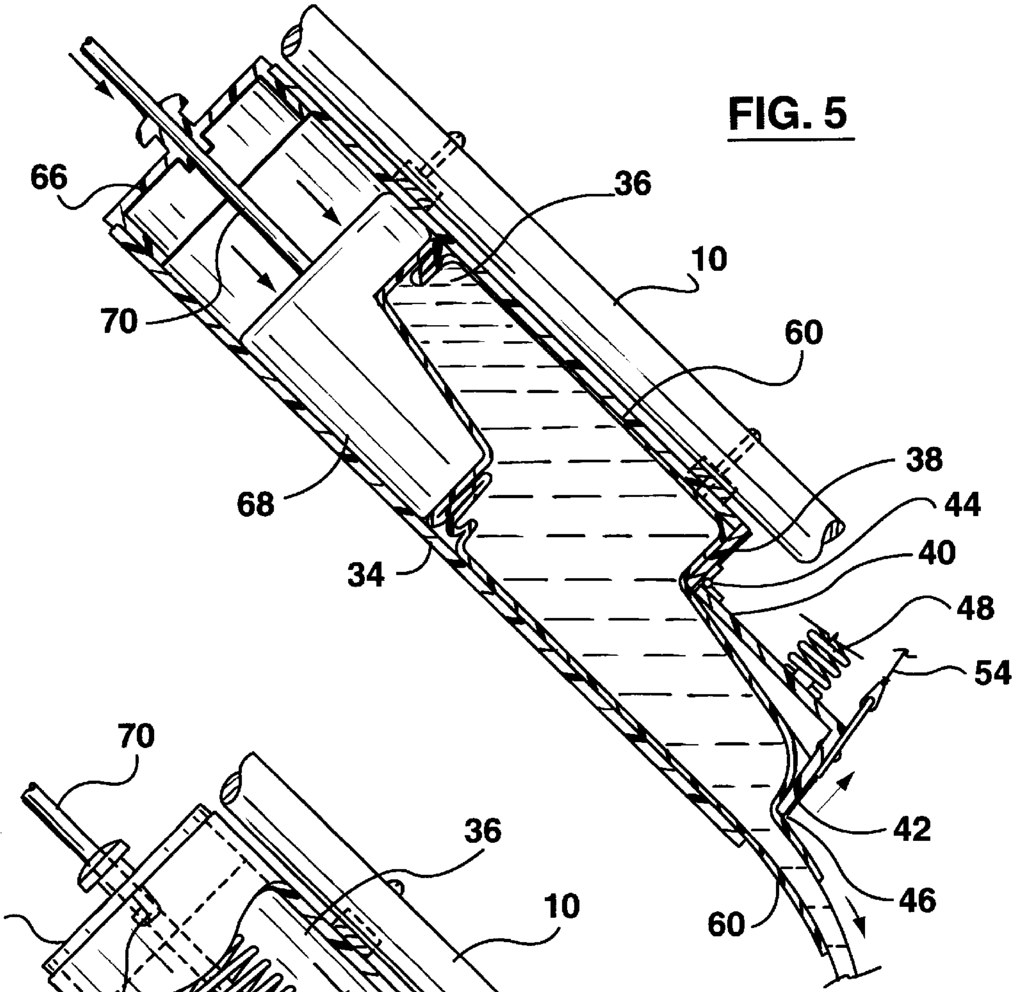
FIG. 5 is a part cross-section similar to FIG. 3 through the resevoir portion only to illustrate another embodiment of the invention.
Figure 6:
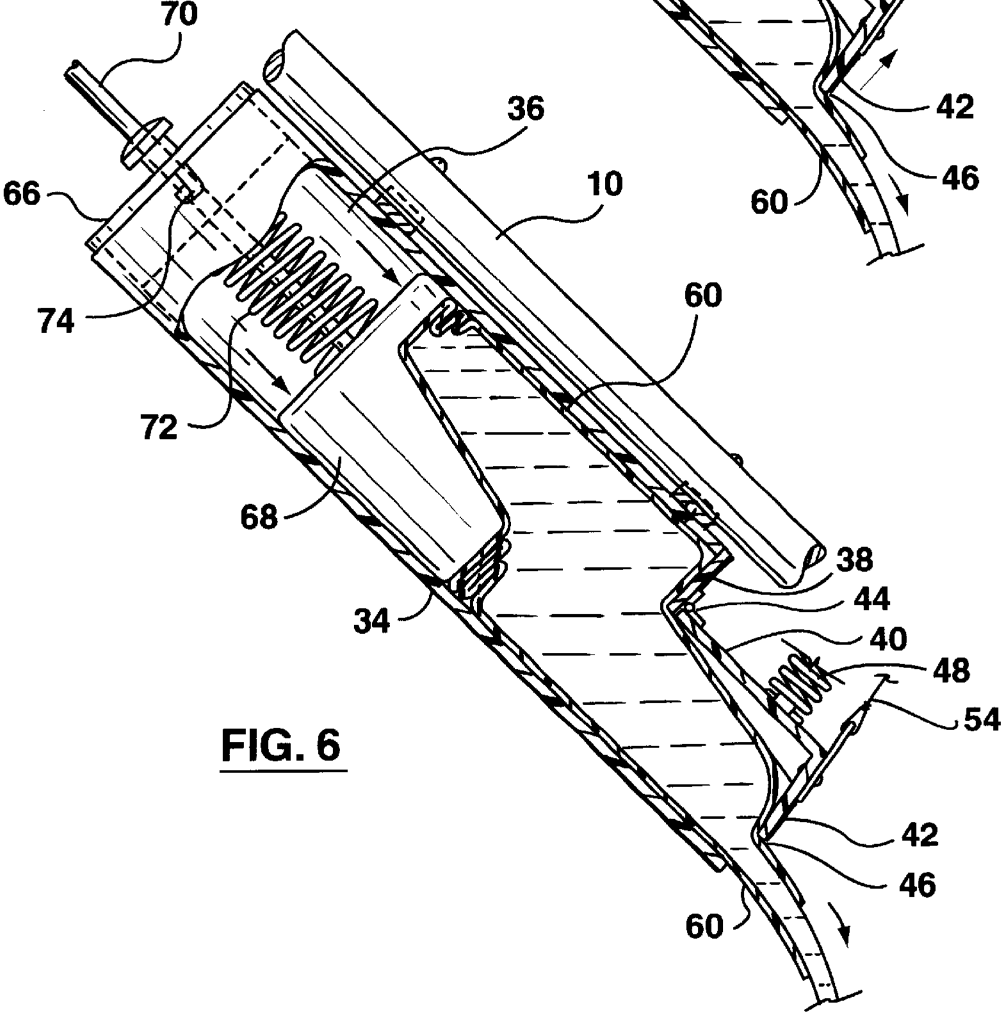
FIGS. 6 is a part cross-section similar to FIG. 3 through the resevoir portion only to illustrate a further embodiment of the invention.

In an alternative arrangement illustrated by FIGS. 4 through 6 the reservoir chamber lining and flowable material container 60 comprises a sealed flexible bag, preferably of plastics material, containing flowable material, as is shown specifically in FIG. 4. Such an arrangement has the particular advantage that the bags can be of convenient size (e.g. 4 litres or 1 gallon) for ready handling, and for relatively small jobs permits the amount of material required to be allocated more exactly with minimization of wastage. The bag is made sufficiently long that upon insertion in the reservoir chamber while sealed a substantial portion of its lower end can protrude below the lower end of the reservoir chamber while the body of flowable material is within the reservoir chamber behind the valve blade 42. Upon installation the lower end of the bag is severed to open it and permit discharge of flowable material under control of the valve means. In both arrangements the plastics material can be transparent, if it is desired to inspect the contents, although suitable transparent materials are generally more expensive than equivalent translucent or opaque materials.

The provision of the flowable material in sealed bags facilitates the provision of spreading apparatus as shown in FIG. 5, wherein the reservoir chamber has a plunger 68 within its interior of the same transverse cross section as the reservoir chamber and of the same shape in side elevation as that of the bottom end of the reservoir chamber, the plunger being an easy sliding fit therein. The plunger is provided with a handle 72 that extends through and is slidable in a bore in the cap 66, the handle protruding from the top end of the reservoir chamber so that it can be grasped and pushed downward by the operator. If at any time it is found that the flowable material is discharging too slowly the operator can apply pressure to the plunger handle to increase the discharge to the required extent, the upper end of the bag remaining closed despite the pressure applied thereto as it empties and is folded down by the plunger. In the spreading apparatus shown in FIG. 6 a compression spring 72 is interposed between the plunger 68 and the cap 66 at the top end of the reservoir chamber, the cap being positively retained by locking fingers 74 (only one shown) against the spring bias. Pressure on the plunger by the spring applies pressure to the bag to increase the discharge of the flowable material from the reservoir chamber, as with the hand operated embodiment of FIG. 5.

I claim:

1. Manually operable spreading apparatus for the uniform spreading on a surface of a flowable material comprising:

a handle for grasping by an operator of the apparatus;

a spreader blade at one end of the handle extending transversely therefrom and having a transversely extending surface engaging edge;

a reservoir body for reception within its interior of the flowable material mounted on the handle intermediate the handle ends, the reservoir body having an upper end and a lower end;

reservoir lining of flexible plastics material for reception within its interior of the flowable material, the reservoir lining also having an upper and a lower end and being disposed within the reservoir body interior with its lower end open at the reservoir body lower end; and valve means comprising a valve member at the lower end of the reservoir body engageable in a valve closed position with the lower end of the reservoir lining to squeeze and close the end and prevent discharge of flowable material from the reservoir lining interior, the valve means being operable by the operator to move it to a valve open position in which flowable material can discharge from the reservoir lining interior on to the surface for engagement and spreading thereon by the spreader blade.

2. Spreading apparatus as claimed in claim 1, wherein the reservoir lining is of length greater than that of the reservoir body so that when installed in the reservoir body it has a substantial length of its lower end extending from the reservoir body lower end and discharging the flowable material closer to the spreader blade.

3. Spreading apparatus as claimed in claim 1, wherein the reservoir lining comprises a sealed bag of the flowable material having upper and lower ends, wherein the bag is insertable in the reservoir body while sealed so that its lower end is adjacent the lower end of the reservoir body, and wherein the lower end is subsequently severable to open it and permit discharge of flowable material therefrom under control of the valve means.

4. Spreading apparatus as claimed in claim 1, wherein the reservoir lining comprises a tube that is open at both upper and lower ends and the upper end of the reservoir body is provided with spring retaining means engageable with the open upper end of the tube to retain the tube against movement relative to the reservoir chamber while it is filled with flowable material and while the flowable material is discharged therefrom.

5. Spreading apparatus as claimed in claim 1, wherein the valve means comprises a valve blade member movable between the open and closed positions, the blade member being of the shape of the cross section of the corresponding part of the lower end of the reservoir body and in the closed position extending across the lower end to squeeze the flexible reservoir lining lower end against a reservoir body interior surface and thereby close the reservoir lining interior against discharge of flowable material therefrom.

6. Spreading apparatus as claimed in claim 5, wherein the reservoir body comprises a tubular body of circular transverse cross section and the valve member comprises a valve body of circular shape in end elevation and Z shape in side elevation;

wherein the top bar of the Z is of segment circle shape and is rigid with the reservoir body;

wherein the cross bar and bottom bar of the Z are rigid with one another;

wherein the cross bar is pivoted to the top bar to permit movement of the cross bar and bottom bar from valve closed position to valve open position; and wherein the bottom bar is of segment circle shape to complete with the top bar and the cross bar the circular end elevation shape, the bottom bar having a part circular circumferential edge that in valve closed position engages the inner circumferential wall of the reservoir chamber and in valve open position is spaced from the inner circumferential wall.

7. Spreading apparatus as claimed in claim 6, wherein the valve means also comprises a valve closing spring interposed between the cross bar and the apparatus handle and urging the valve member to the valve closed positions; and wherein means for opening the valve against the urge of the valve closing spring comprise a lever pivoted to the apparatus handle adjacent its upper end and a movable connection between the lever and the valve body, pivoting movement of the lever in one direction causing movement of the valve member to an open position, and pivoting movement in the other direction permitting movement of the valve member to the closed position.

8. Spreading apparatus as claimed in claim 1, wherein the reservoir body comprises a plunger within its interior of the same transverse cross section as the reservoir body interior, and a handle on the plunger protruding from the top end of the reservoir body, whereby pressure on the plunger handle by an operator applies pressure to the plunger to increase the discharge of the flowable material from the reservoir lining interior.

9. Spreading apparatus as claimed in claim 1, wherein the reservoir body comprises a plunger within its interior of the same transverse cross section as the reservoir body interior, and a compression spring interposed between the plunger and the top end of the reservoir body, whereby pressure on the plunger handle by the spring applies pressure to increase the discharge of the flowable material from the reservoir lining interior.

10. Spreading apparatus as claimed in claim 1, and comprising a pair of side retainer blades pivotally mounted at respective ends of the spreader blade, each having a surface engaging edge extending at a respective right angle to the spreader blade surface engaging edge, the side retainer blades forming with the spreader blade a rectangular retaining structure into which flowable material to be spread is discharged and which confines the flowable material to the area of the surface over which the spreader blade is moved by the operator; and spring means operative between each side retainer blade and the spreader blade and urging the respective side retainer blade to rotate in the direction required to maintain contact of its entire surface engaging edge with the surface as the inclination of the handle to the surface is changed.

11. Spreading apparatus as claimed in claim 1, wherein the spreader blade comprises a main blade member attached to the handle and a subsidiary blade member detachably attached to the main blade member and providing the spreader blade surface engaging edge.

12. Spreading apparatus for the uniform spreading on a surface of a flowable material which has been deposited on the surface comprising:

a handle for grasping by an operator of the apparatus;

a spreader blade at one end of the handle extending transversely therefrom at a right angle thereto and having a transversely extending surface engaging edge;

a pair of side retainer blades pivotally mounted at respective ends of the spreader blade, each having a surface engaging edge extending at a respective right angle to the spreader blade surface engaging edge, the side retainer blades forming with the spreader blade a rectangular retaining structure into which the flowable material to be spread has been discharged and which confines the flowable material to the area of the surface over which the spreader blade is moved by the operator; and spring means operative between each side retainer blade and the spreader blade and urging the respective side retainer blade to rotate in the direction required to maintain contact of its entire surface engaging edge with the surface as the inclination of the handle to the surface is changed.

13. Spreading apparatus as claimed in claim 12, wherein the spreader blade comprises a main blade member attached to the handle and a subsidiary blade member detachably attached to the main blade member and providing the spreader blade surface engaging edge.

14. Manually operable spreading apparatus for the uniform spreading on a surface of a flowable material comprising:

a handle for grasping by an operator of the apparatus;

a spreader blade at one end of the handle extending transversely therefrom and having a transversely extending surface engaging edge;

a reservoir chamber for flowable material on the handle intermediate its ends, the reservoir chamber having an upper end and a lower end;

a reservoir lining of flexible plastics material within the reservoir chamber comprising a container for the flowable material;

valve means at the lower end of the reservoir chamber operable by the operator to permit discharge of flowable material from the reservoir lining interior on to the surface for engagement and spreading thereon by the spreader blade;

the valve means being operable with the container formed by the reservoir lining to control the discharge of the flowable material therefrom; and wherein the reservoir lining is of length greater than that of the reservoir chamber so that when installed in the reservoir chamber it has a substantial length of its lower end extending from the reservoir chamber lower end and discharging the flowable material closer to the spreader blade.

15. Spreading apparatus as claimed in claim 14, wherein the reservoir lining and flowable material container comprises a sealed bag of the flowable material having upper and lower ends, wherein the bag is insert able in the reservoir chamber while sealed so that its lower end is adjacent the lower end of the reservoir chamber, and wherein the lower end is subsequently severable to open it and permit discharge of flowable material therefrom under control of the valve means.

16. Spreading apparatus as claimed in claim 14, wherein the reservoir chamber comprises a tubular chamber body of circular transverse cross section with an inner cylindrical wall, and the valve means comprises a valve blade member movable between open and closed positions corresponding respectively to valve open and valve closed positions, the blade member being of circular shape in end elevation and Z shape in side elevation;

wherein the top bar of the Z is of segment circle shape and is rigid with the reservoir chamber body;

wherein the cross bar and bottom bar of the Z are rigid with one another;

wherein the cross bar is pivoted to the top bar to permit movement of the cross bar and bottom bar from valve closed position to valve open position; and wherein the bottom bar is of segment circle shape to complete with the top bar and the cross bar the circular end elevation shape, the bottom bar having a part circular circumferential edge that in valve closed position presses the reservoir lining against the inner wall of the reservoir chamber and in valve open position is spaced from the reservoir body inner cylindrical wall.

17. Spreading apparatus as claimed in claim 14, wherein the reservoir chamber comprises a plunger within its interior of the same transverse cross section as the reservoir chamber, and a handle on the plunger protruding from the top end of the reservoir chamber, whereby pressure on the plunger handle by an operator applies pressure to the plunger to increase the discharge of the flowable material from the reservoir chamber.

18. Spreading apparatus as claimed in claim 14, wherein the reservoir chamber comprises a plunger within its interior of the same transverse cross section as the reservoir chamber, and a compression spring interposed between the plunger and the top end of the reservoir chamber, whereby pressure on the plunger by the spring applies pressure to increase the discharge of the flowable material from the reservoir chamber.

19. Spreading apparatus as claimed in claim 14, and comprising a pair of side retainer blades pivotally mounted at respective ends of the spreader blade, each having a surface engaging edge extending at a respective right angle to the spreader blade surface engaging edge, the side retainer blades forming with the spreader blade a rectangular retaining structure into which flowable material to be spread is discharged and which confines the flowable material to the area of the surface over which the spreader blade is moved by the operator; and spring means operative between each side retainer blade and the spreader blade and urging the respective side retainer blade to rotate in the direction required to maintain contact of its entire surface engaging edge with the surface as the inclination of the handle to the surface is changed.

20. Manually operable spreading apparatus for the uniform spreading on a surface of a flowable material comprising:

a handle for grasping by an operator of the apparatus;

a spreader blade at one end of the handle extending transversely therefrom and having a transversely extending surface engaging edge;

a reservoir body for reception within its interior of the flowable material mounted on the handle intermediate the handle ends, the reservoir body having an upper end and a lower end;

a reservoir lining of flexible plastics material for reception of the flowable material within its interior, the reservoir lining also having an upper and a lower end and comprising an open-ended tube insertable in the reservoir body so that its upper and lower ends are adjacent respectively the upper and lower ends of the reservoir chamber;

spring retaining means at the upper end of the reservoir chamber engageable with the tube upper open end to retain the tube against movement relative to the reservoir chamber while it is filled with flowable material and while flowable material is discharged from its interior; and valve means at the lower end of the reservoir body operable by the operator between open and closed positions, the lower end of the tube being closable by the valve means in the closed position to retain the flowable material therein and openable by operation of the valve means to the open position to permit discharge of flowable material from the interior of the tube on to the surface for engagement and spreading thereon by the spreader blade.

21. Spreading apparatus as claimed in claim 20, wherein the reservoir lining is of length greater than that of the reservoir body so that when installed in the reservoir body it has a substantial length of its lower end extending from the reservoir body lower end and discharging the flowable material closer to the spreader blade.

22. Spreading apparatus as claimed in claim 20, wherein the reservoir lining comprises a sealed bag of the flowable material having upper and lower ends, wherein the bag is insertable in the reservoir body while sealed so that its lower end is adjacent the lower end of the reservoir body, and wherein the lower end is subsequently severable to open it and permit discharge of flowable material therefrom under control of the valve means.

23. Spreading apparatus as claimed in claim 20, wherein the reservoir body comprises a tubular body of circular transverse cross section having a cylindrical inner wall;

the valve means comprises a valve member movable between open and closed positions corresponding to the open and closed positions of the valve means; and wherein the valve member comprises a valve body of circular shape in end elevation and Z shape in side elevation;

wherein the top bar of the Z is of segment circle shape and is rigid with the reservoir chamber body;

wherein the cross bar and bottom bar of the Z are rigid with one another;

wherein the cross bar is pivoted to the top bar to permit movement of the cross bar and bottom bar from valve closed position to valve open position; and wherein the bottom bar is of segment circle shape to complete with the top bar and the cross bar the circular end elevation shape, the bottom bar having a part circular circumferential edge that in valve closed position engages the reservoir lining and presses it against the inner circumferential wall of the reservoir body and in valve open position is spaced from the inner circumferential wall.

24. Spreading apparatus as claimed in claim 20, wherein the reservoir body comprises a plunger within its interior of the same transverse cross section as the reservoir body and a handle on the plunger protruding from the top end of the reservoir body, whereby pressure on the plunger handle by an operator applies pressure to the plunger to increase the discharge of the flowable material from the reservoir lining interior.

25. Spreading apparatus as claimed in claim 20, wherein the reservoir body comprises a plunger within its interior of the same transverse cross section as the reservoir body, and a compression spring interposed between the plunger and the top end of the reservoir body, whereby pressure on the plunger by the spring applies pressure to increase the discharge of the flowable material from the reservoir lining interior.

26. Spreading apparatus as claimed in claim 20, and comprising a pair of side retainer blades pivotally mounted at respective ends of the spreader blade, each having a surface engaging edge extending at a respective right angle to the spreader blade surface engaging edge, the side retainer blades forming with the spreader blade a rectangular retaining structure into which flowable material to be spread is discharged and which confines the flowable material to the area of the surface over which the spreader blade is moved by the operator; and spring means operative between each side retainer blade and the spreader blade and urging the respective side retainer blade to rotate in the direction required to maintain contact of its entire surface engaging edge with the surface as the inclination of the handle to the surface is changed.

27. Manually operable spreading apparatus for the uniform spreading on a surface of a flowable material comprising:

a handle for grasping by an operator of the apparatus;

a spreader blade at one end of the handle extending transversely therefrom and having a transversely extending surface engaging edge;

a pair of side retainer blades pivotally mounted at respective ends of the spreader blade, each having a surface engaging edge extending at a respective right angle to the spreader blade surface engaging edge, the side retainer blades forming with the spreader blade a rectangular retaining structure into which flowable material to be spread is discharged and which confines the flowable material to the area of the surface over which the spreader blade is moved by the operator; and spring means operative between each side retainer blade and the spreader blade and urging the respective side retainer blade to rotate in the direction required to maintain contact of its entire surface engaging edge with the surface as the inclination of the handle to the surface is changed;

a reservoir chamber for flowable material on the handle intermediate its ends, the reservoir chamber having an upper end and a lower end; and valve means at the lower end of the reservoir chamber operable by the operator to permit discharge of flowable material from the reservoir interior on to the surface for engagement and spreading thereon by the spreader blade.

28. Spreading apparatus as claimed in claim 27, wherein the reservoir chamber is provided with a lining of flexible plastics material comprising a container for the flowable material and the valve means is operable with the container formed by the lining to control the discharge of the flowable material therefrom.

29. Spreading apparatus as claimed in claim 28, wherein the reservoir chamber lining and flowable material container comprises a sealed bag of the flowable material having upper and lower ends, wherein the bag is insertable in the reservoir chamber while sealed so that its lower end is adjacent the lower end of the reservoir chamber, and wherein the lower end is subsequently severable to open it and permit discharge of flowable material from its interior under control of the valve means.

30. Spreading apparatus as claimed in claim 29, wherein the reservoir chamber comprises a tubular body of circular transverse cross section having a cylindrical inner wall;

wherein the valve means comprises a valve member movable between open and closed positions corresponding to the open and closed positions of the valve means; and wherein the valve member comprises a valve body of circular shape in end elevation and Z shape in side elevation;

the top bar of the Z being of segment circle shape and being rigid with the reservoir chamber body;

the cross bar and bottom bar of the Z being rigid with one another;

the cross bar-being pivoted to the top bar to permit movement of the cross bar and bottom bar from valve closed position to valve open position; and the bottom bar being of segment circle shape to complete with the top bar and the cross bar the circular end elevation shape, the bottom bar having a part circular circumferential edge that in valve closed position engages the the reservoir lining and presses it against the inner wall of the reservoir body and in valve open position is spaced from the inner wall.

* * * * *